United States Patent
Choi et al.

(10) Patent No.: US 8,865,299 B2
(45) Date of Patent: Oct. 21, 2014

(54) MULTI-LAYERED ACRYLIC RETARDATION FILM AND FABRICATION METHOD THEREOF

(75) Inventors: Jeong-Min Choi, Daejeon (KR); Yoo-Seong Hong, Daejeon (KR); Min-Hee Lee, Daejeon (KR); Sang-Min Kwak, Daejeon (KR); Jun-Geun Um, Suwon-si (KR); Kyung-Sik Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 939 days.

(21) Appl. No.: 12/809,482

(22) PCT Filed: Dec. 19, 2008

(86) PCT No.: PCT/KR2008/007539
§ 371 (c)(1),
(2), (4) Date: Mar. 7, 2011

(87) PCT Pub. No.: WO2009/082131
PCT Pub. Date: Jul. 2, 2009

(65) Prior Publication Data
US 2011/0171441 A1    Jul. 14, 2011

(30) Foreign Application Priority Data

Dec. 20, 2007 (KR) .................. 10-2007-0133993

(51) Int. Cl.
*B32B 27/18* (2006.01)
*G02B 5/30* (2006.01)
*B32B 27/30* (2006.01)

(52) U.S. Cl.
CPC .............. *B32B 27/30* (2013.01); *B32B 27/18* (2013.01); *G02B 5/3083* (2013.01)
USPC ............ 428/212; 428/220; 428/336; 428/500

(58) Field of Classification Search
USPC .................. 428/212, 220, 336, 500
See application file for complete search history.

(56) References Cited

U.S. PATENT DOCUMENTS

| 4,242,384 | A | * | 12/1980 | Andrew et al. | 427/427.4 |
| 5,330,788 | A | * | 7/1994 | Roberts | 427/154 |
| 6,926,945 | B2 | | 8/2005 | Yano et al. | |
| 2005/0233124 | A1 | * | 10/2005 | Marot et al. | 428/216 |
| 2005/0238879 | A1 | | 10/2005 | Shoshi et al. | |
| 2006/0008642 | A1 | | 1/2006 | Marot et al. | |
| 2006/0237122 | A1 | * | 10/2006 | Dhawan et al. | 156/244.11 |
| 2007/0184278 | A1 | * | 8/2007 | Wei et al. | 428/411.1 |
| 2008/0145652 | A1 | * | 6/2008 | Bonnet et al. | 428/336 |
| 2009/0043047 | A1 | | 2/2009 | Ha et al. | |
| 2009/0135483 | A1 | | 5/2009 | Asano et al. | |
| 2009/0257003 | A1 | | 10/2009 | Yoshihara et al. | |

FOREIGN PATENT DOCUMENTS

| JP | 03-023404 A | 1/1991 |
| JP | 2001-350017 A | 12/2001 |
| JP | 2004-051928 A | 2/2004 |
| JP | 2004-256632 A | 9/2004 |
| JP | 2005-099191 A | 4/2005 |
| JP | 2006-192637 A | 7/2006 |
| KR | 10-2005-0045873 A | 5/2005 |
| WO | WO 2007/099927 A1 | 9/2007 |
| WO | WO 2007/119560 A1 | 10/2007 |
| WO | 2007129835 A1 | 11/2007 |

* cited by examiner

*Primary Examiner* — Aaron Austin
*Assistant Examiner* — Lawrence Ferguson
(74) *Attorney, Agent, or Firm* — McKenna, Long & Aldridge LLP

(57) ABSTRACT

The present invention provides a retardation film that comprises a) a first acrylic resin layer; and b) a second acrylic resin layer that is layered on at least one side of a) the first acrylic resin layer and comprises an acrylic resin and 1 to 20 parts by weight of rubber component based on 100 parts by weight of the acrylic resin. The retardation film according to the present invention has excellent optical transparency, haze, brittleness, mechanical strength, heat resistance, durability, and the like.

17 Claims, No Drawings

MULTI-LAYERED ACRYLIC RETARDATION FILM AND FABRICATION METHOD THEREOF

This application is a 35 U.S.C. §371 National Stage entry of International Application No. PCT/KR2008/007539, filed on Dec. 19, 2008, and claims priority to Korean Application No. 10-2007-0133993, filed on Dec. 20, 2007, which are all hereby incorporated by reference in their entireties.

TECHNICAL FIELD

The present invention relates to a multi-layered retardation film that has excellent optical transparency and durability, a method for manufacturing the same, and an image display device comprising the same.

This application claims priority from Korea Patent Application No. 10-2007-0133993 filed on Dec. 20, 2007 in the KIPO, the disclosure of which is incorporated herein by reference in its entirety.

BACKGROUND ART

Recently, display technologies using various methods such as a plasma display panel (PDP), a liquid crystal display (LCD) and the like that are used instead of a known brown tube in accordance with the development of optical technologies are suggested and sold. The higher properties of the polymer material for displays are required. For example, in the case of the liquid crystal display, according to the development toward the thin film, the lightness, and enlargement of the picture area, the wide viewing angle, the high contrast, the suppression of change in picture color tone according to the viewing angle and the uniformity of the picture display are particularly considered as important problems. Therefore, various polymer films such as a polarizing film, a retardation film, a plastic substrate, a light guide plate and the like are used, and in particular, in order to provide the retardation film for the wide viewing angle, a film in which a retardation function is provided by stretching various kinds of polymers has been suggested. These retardation films that have a single layer structure and a multilayered structure have been suggested.

For example, a method using a cyclic polyolefin polymer (COP) has been suggested (Japanese Patent Application Laid-Open Nos. 2001-350017 and 2004-51928). However, there is a problem in that the cyclic polyolefin resin has a reduced adhesion property in respects to other substrates such as films, and there is a problem in that since it has a small change ratio in retardation because of the extension, a sufficient retardation as a retardation film is not ensured.

Accordingly, in Japanese Patent No. 2886893, a copolymer resin of styrene and maleic anhydride that includes methyl methacrylate (MMA) as a main component and is extended is used as a retardation plate. As described in the patent document, if an acrylic resin is used, a retardation plate that is transparent, has no haze, and has a predetermined retardation obtained through the extension may be manufactured.

However, in the case of when the retardation film is manufactured as suggested in the patent document, because of the characteristics of an acrylic resin composition, the film is made brittle. Thus, there are problems in that unstability occurs in a roll while the film is processed and a difficulty in attachment to a polarizer occurs, which makes a processing process difficult, thus it is difficult for it to be used as the retardation film.

In addition, a multi-layered retardation film that is obtained by layering the acrylic film has been suggested by Japanese Patent Application Laid-Open No. 2006-192637. In the patent document, a styrene resin is used as an intermediate layer and an acrylic resin is layered on both sides for use.

However, as suggested in the patent document, if a styrene-maleic anhydride copolymerization resin is used in an intermediate layer and an acrylic resin that includes an acrylic rubber is used on both sides thereof, because of a difference between glass transition temperatures ($T_g$) of two layers, there is a problem in terms of heat resistance.

DISCLOSURE OF INVENTION

Technical Problem

Accordingly, the present invention has been made to solve the problem, and it is an object of the present invention to provide a multi-layered retardation film that has excellent optical characteristics such as the in-plane retardation or the thickness retardation and excellent optical transparency, is capable of solving a disadvantage of a brittle acrylic film, and has excellent processability and durability such as heat resistance with good productivity.

Technical Solution

The present invention provides a retardation film that comprises a) a first acrylic resin layer; and b) a second acrylic resin layer that is layered on at least one side of a) the first acrylic resin layer and comprises an acrylic resin and 1 to 20 parts by weight of rubber component based on 100 parts by weight of the acrylic resin.

In addition, the present invention provides a method for manufacturing a retardation film, which comprises the steps of 1) manufacturing a film which comprises a) a first acrylic resin layer and in which b) a second acrylic resin layer including an acrylic resin and 1 to 20 parts by weight of rubber component based on 100 parts by weight of the acrylic resin is layered on at least one side of a) the first acrylic resin layer; and 2) stretching the film.

In addition, the present invention provides an image display device that comprises the retardation film.

Advantageous Effects

Through the present invention, a multi-layered acrylic retardation film that has excellent heat resistance and optical transparency, low haze, is not broken, and has excellent mechanical strength and durability may be provided with good productivity.

BEST MODE FOR CARRYING OUT THE INVENTION

Hereinafter, the present invention will be described in detail below.

A retardation film according to the present invention comprises a) a first acrylic resin layer; and b) a second acrylic resin layer that is layered on at least one side of a) the first acrylic resin layer and comprises an acrylic resin and 1 to 20 parts by weight of rubber component based on 100 parts by weight of the acrylic resin.

According to the present invention, a multi-layered retardation film that has excellent optical characteristics such as the in-plane retardation or the thickness retardation and excellent optical transparency, is capable of solving a problem of brittleness that is a disadvantage of the acrylic film, has excellent mechanical strength such as tensile strength and heat resistance may be manufactured with good process ability and high productivity. In addition, since the multi-layered optical film that is manufactured by layering films having similar glass transition temperatures is stable under the high temperature, the retardation film having the excellent heat resistance may be provided.

The multi-layered film according to the present invention may provide a retardation film that has high mechanical strength by ensuring a separate layer for compensating disadvantages of the acrylic film that is easily broken without a loss of optical properties as compared to a film that has a single layer structure.

In the present specification, an "acrylic resin layer" is defined by a resin layer that comprises 40% by weight or more of the acrylic resins.

Hereinafter, preferred embodiments will be described in detail, but the present invention is not limited thereto.

In the retardation film according to the present invention, a) the first acrylic resin layer and b) the second acrylic resin layer comprising the rubber component comprises the acrylic resin.

The glass transition temperature ($T_g$) of a) the fist acrylic resin layer and b) the second acrylic resin layer comprising the rubber component is preferably in the range of 100 to 250° C. and more preferably in the range of 110 to 250° C. The retardation film that comprises the acrylic resin layer having the glass transition temperature ($T_g$) that is 100° C. or more has excellent durability.

A difference between the glass transition temperature ($T_g$) of a) the first acrylic resin layer and the glass transition temperature ($T_g$) of b) the second acrylic resin layer comprising the rubber component is preferably in the range of 0 to 30° C. and more preferably in the range of 0 to 20° C. In the case of when the difference between the temperatures is more than 30° C., because of a difference between thermal stabilities of the two layers, there is a problem in that the heat resistance is reduced.

In the retardation film that comprises a) the first acrylic resin layer and b) the second acrylic resin layer comprising the rubber component, the content of the acrylic resin is preferably in the range of 40 to 99% by weight, more preferably in the range of 50 to 98% by weight, and most preferably in the range of 60 to 97% by weight. In the case of when the content of the acrylic resin is less than 40% by weight, the high heat resistance and the high transparency which the acrylic resin intrinsically has may not be sufficiently shown, and in the case of when the content of the acrylic resin is more than 99% by weight, there is a problem in that the mechanical strength is reduced.

In the retardation film according to the present invention, as examples of the acrylic monomer that is capable of forming acrylic resin in a) the first acrylic resin layer and b) the second acrylic resin layer comprising the rubber component, there are the following compounds. The examples thereof are methyl methacrylate, ethyl methacrylate, propyl methacrylate, n-butyl methacrylate, t-butyl methacrylate, cyclohexyl methacrylate, benzyl methacrylate, methoxyethyl methacrylate, ethoxyethyl methacrylate, butoxymethyl methacrylate, hydroxyethyl methacrylate and an oligomer thereof.

In a) the first acrylic resin layer and b) the second acrylic resin layer comprising the rubber component, other components may be comprised in the acrylic resin that is the main component or as a separate component. In order to increase the mechanical strength of the acrylic resin, a resin that has a high glass transition temperature (Tg), for example, a styrene monomer, a maleic anhydride monomer, a maleimide monomer and the like, may be comprised as an additional comonomer in addition to the acrylic monomer, and by adding SMA that is a styrene-maleic anhydride copolymer and the like, blending may be performed. In the case of when the components of the canposition are 3 or more, it may be manufactured in a multi-source copolymer.

In the retardation film according to the present invention, among the other components that may be comprised in the acrylic resin, the content of the styrene monomer in the acrylic copolymer is preferably in the range of 1 to 60% by weight and more preferably more than 5% by weight and 30% by weight or less. In addition, the content of the maleic anhydride monomer or maleimide monomer in the acrylic copolymer is preferably in the range of 3 to 30% by weight and more preferably in the range of 3 to 15% by weight.

In addition, a) the first acrylic resin layer and b) the second acrylic resin layer comprising the rubber component may further comprise an additive such as a UV absorbing agent, a plasticizer, and the like.

The UV absorbing agent may be used alone or as a mixture of two or more, and in each layer, it may be comprised in the intermediate layer but not in an external layer or it may be comprised in all the layers. As examples of the UV absorbing agent, there are a triazine UV absorbing agent, a triazole UV absorbing agent, a HALS (hindered amine light stabilizer) UV absorbing agent, and the like.

As examples of the plasticizer, there are a phosphate ester plasticizer, a carboxylic acid ester plasticizer, and the like. As the phosphate ester plasticizer, triphenyl phosphate, tributyl phosphate and the like may be used, and as the carboxylic acid ester plasticizer, diethyl phthalate, diphenyl phthalate and the like may be used.

In addition to the UV absorbing agent and plasticizer, in order to control the retardation of the retardation film, a retardation accelerating agent may be added to a dope. As the retardation accelerating agent, a material that has an aromatic cycle is mainly used, and the number of aromatic cycles is not largely limited, but preferably in the range of 2 to 6. For example, trans-stilbene, diphenylacetylene, trans,trans-1,4-diphenyl-1,3-butadiene, biphenyl, fluorine, dibenzofuran, 2,7-dibromofluorene, carbazole, N-vinyl carbazole and the like may be used in an amount of 10 parts by weight on the basis of 100 parts by weight of the acrylic resin.

In the retardation film according to the present invention, it is preferable that the thickness of a) the first acrylic resin layer is in the range of 2 to 100 μm, but is not limited thereto.

In the retardation film according to the present invention, b) the second acrylic resin layer comprising the rubber component that is layered on at least one side of a) the first acrylic resin layer comprises the acrylic resin as the main component, and is a resin layer that includes 1 to 20 parts by weight of the rubber component on the basis of 100 parts by weight of the acrylic resin.

The content of the rubber component that is comprised in b) the second acrylic resin layer is preferably in the range of 1 to 20 parts by weight, more preferably in the range of 1 to 15 parts by weight, and most preferably in the range of 1 to 10 parts by weight on the basis of 100 parts by weight of the acrylic resin. In the case of when the content of the rubber component is less than 1 part by weight, realization of the excellent mechanical strength is difficult to be ensured, a problem occurs in a processing process because the film is easily broken, and optical performance is not sufficiently realized. On the other hand, in the case of when the content of the rubber component is more than 20 parts by weight, the high heat resistance and the high transparency which the acrylic resin intrinsically has may not be sufficiently shown and a problem such as the occurrence of haze in a stretching process may occur.

In the case of when the refractive indexes of the acrylic resin and the rubber component are similar to each other, since a thermoplastic resin composition that has excellent transparency may be obtained, if the rubber component is a rubber or rubber-acrylic graft type core-shell polymer that has a refractive index in the range of 1.480 to 1.550, which is similar to the refractive index of the acrylic resin, it is not particularly limited. For example, alkyl acrylate such as butyl acrylate or 2-ethyl hexyl acrylate may be used, and silicones such as dimethyl siloxane, phenyl methyl siloxane and the like, and dienes such as butadiene, isoprene and the like may be used. As the rubber-acrylic graft type core-shell polymer, particles that have a rubber based on butadiene or a butyl acrylate-co-styrene copolymer as a core and poly(methyl methacrylate) (PMMA) or polystyrene as a shell and have a size in the range of 50 to 400 nm may be used.

In the retardation film according to the present invention, the thickness of b) the second acrylic resin layer comprising the rubber component is preferably in the range of 2 to 50 μm, and the total thickness of the retardation film is preferably in the range of 4 to 200 μm, but is not limited thereto.

In the retardation film according to the present invention, it is preferable that an in-plane retardation value ($R_{in}$) is in the range of 50 to 250 nm, and a thickness retardation value ($R_{th}$) is in the range of 50 to 250 nm. The definitions of the in-plane retardation ($R_{in}$) and the thickness retardation ($R_{th}$) are the same as those of the following Equations.

$$R_{in} = (N_x - N_y) \times d \quad \text{[Equation 1]}$$

$$R_{th} = (N_z - N_y) \times d \quad \text{[Equation 2]}$$

In Equations 1 and 2, $N_x$ is an in-plane refractive index in an extending direction, $N_y$ is an in-plane refractive index in a direction that is vertical to the extending direction, $N_z$ is a refractive index of the thickness direction, and d is the thickness of the film.

The retardation film according to the present invention has a multi-layered structure which includes a) the first acrylic resin layer and b) the second acrylic resin layer comprising the rubber component is layered on at least one side of a) the first acrylic resin layer. In the retardation film, a) the first acrylic resin layer and b) the second acrylic resin layer comprising the rubber component may be each layered by one layer, or at least one layer of a) the first acrylic resin layer and b) the second acrylic resin layer comprising the rubber component may be each layered by two or more layers. In the case of when a plurality of a) the first acrylic resin layer and b) the second acrylic resin layer comprising the rubber component are layered, it is preferable that the external layer of the retardation film is b) the second acrylic resin layer comprising the rubber component.

It is more preferable that the retardation film according to the present invention is a retardation film having a three layer structure in which b) the second acrylic resin layer comprising the rubber component is layered on both sides of a) the first acrylic resin layer.

In addition, a method for manufacturing a retardation film according to the present invention comprises the steps of 1) manufacturing a film which comprises a) a first acrylic resin layer and in which b) a second acrylic resin layer comprising an acrylic resin and 1 to 20 parts by weight of rubber component based on 100 parts by weight of the acrylic resin is layered on at least one side of a) the first acrylic resin layer; and 2) stretching the film.

In the method for manufacturing the multi-layered retardation film according to the present invention, materials for forming the acrylic resin, the rubber component and the like are the same as those described in the above.

In the method for manufacturing the retardation film according to the present invention, a method for manufacturing the acrylic resin layer of step 1), a method for layering the acrylic resin layer and the like are not limited thereto, but a general method that is known in the art may be applied thereto.

As the method for manufacturing the retardation film, a specific example thereof may be an extrusion molding method, but is not limited thereto.

The film using the extrusion molding method may be manufactured by using the following procedure. The film may be manufactured by vacuum drying a resin, adding a rubber component or other additives, melting them in an extruder at high temperatures to obtain raw material pellets, melting the obtained raw material pellet using the extruder, passing it through a coat hanger type T-die, and passing it through a chrome plating casting roll and a dry roll.

In addition, the method for layering the acrylic resin layer may be subjected to a step for laminating after each acrylic resin layer is extruded or a step for separately laminating the acrylic resin layers after each acrylic resin layer is manufactured, and for example, the laminating may be performed by using a method for passing it between two opposite tools under a heating and/or pressing condition, but is not limited thereto.

Through the stretching treatment of step 2), the retardation film according to the present invention may obtain a desired retardation. The stretching process may perform a machine direction (MD) stretching, a transverse direction (TD) stretching, or all of them. In the case of when it is stretched in the machine direction and the transverse direction, it may be stretched in another direction after it is stretched in one direction, or it may be stretched simultaneously in two directions. The stretching may be performed through one step, or through multisteps. In the stretching process, the stretching temperatures are different from each other according to the composition of the resin, and normally in the range of 80 to 250° C., preferably in the range of 100 to 200° C., and particularly preferably in the range of 120 to 180° C.

In the stretching process, a stretching ratio is in the range of 1 to 5 times in the machine direction, preferably in the range of 1 to 3 times, and particularly preferably in the range of 1 to 2 times. The stretching ratio of the transverse direction is in the range of 1 to 5 times, preferably in the range of 1 to 3 times, and particularly preferably in the range of 1 to 2 times. Through this stretching, the retardation film that has the in-plane retardation in the range of 50 to 250 nm and the thickness retardation in the range of 50 to 250 nm may be obtained.

In addition, the present invention provides an image display device comprising the retardation film.

The multi-layered retardation film according to the present invention may be used in a film for optics in terms of excellent optical characteristics and durability, and in detail, it may be used as a transparent optical film of a liquid crystal display, a flat panel display, and a plasma display. In particular, since it has excellent birefringence and retardation ability, it may be preferably used for a retardation film of a liquid crystal display.

Mode for the Invention

A better understanding of the present invention may be obtained in light of the following Examples which are set forth to illustrate, but are not to be construed to limit the present invention. In addition, measured values of the present invention were evaluated by the following analysis methods.

(Glass Transition Temperature)

The glass transition temperature was measured by increasing the temperature at a rate of 10° C./min to 250° C. using DSC (Differential scanning calorimeter, model DSC 8230) manufactured by Mettler Toledo, Co., Ltd.

(Heat Resistance)

The heat resistance of the retardation film was obtained by observing an appearance state of the film after it was left in an oven at 80° C. for 100 hours.

(Retardation)

The retardation of the film was measured at an interval of 10° in the range of −50° to +50° in an extension direction and a direction that was vertical to this by using AxoScan (Axometrics). The in-plane retardation and the thickness retardation are defined by $R_{in}$ (in-plane retardation) and $R_{th}$ (thickness retardation) of Equations 1 and 2, respectively.

(Transmittance)

The transmittance was measured using N&K Analyzer (model 1280, N&K Technology) by cutting the film into pieces having the width and the length of 40 nm. After it was measured from 200 nm to 900 nm, an average value in the range of 400 nm to 800 nm was recorded.

(Haze)

The haze was measured at a wavelength of 555 nm by using a hazemeter (model HR-100) that was manufactured by Murakami Color Research Laboratory, Co., Ltd.

(Tensile Strength)

The tensile strength was measured at roan temperature and a relative humidity of 50% by using UTM (Universal testing machine, model Z010) that was manufactured by Zwicic/Roell, Co., Ltd. The sample was manufactured to have the width of 10 nm, and the tensile strength was measured at a tensile rate of 100 mm/min.

EXAMPLE 1

The acrylic resin that was 74% by weight of methyl methacrylate, 11% by weight of maleic anhydride, and 15% by weight of styrene was subjected to extrusion molding to manufacture a film that was a first layer and have the thickness of 60 μm. In addition, by adding 10 parts by weight of the butylacrylate-methyl methacrylate resin graft type core-shell polymer in respects to 100 parts by weight of the acrylic resin that was 75% by weight of methyl methacrylate, 11% by weight of maleic anhydride, and 14% by weight of styrene, the film having the thickness of 20 μm was manufactured. These were used as second and third layers, and a multilayered film that included 2-1-3 layers was manufactured. By stretching the multilayered film at 120° C. by 100%, the retardation film that had the thickness of 60 μm was manufactured. The in-plane retardation of the retardation film was 145 nm, the thickness retardation was 150 nm, and there was no problem in terms of appearance when the heat resistance evaluation was performed at 80° C. for 100 hours.

EXAMPLE 2

The acrylic resin that was 80% by weight of methyl methacrylate, 8% by weight of maleic anhydride, and 12% by weight of styrene was subjected to extrusion molding to manufacture a film that was a first layer and have the thickness of 40 μm. In addition, by adding 15 parts by weight of the butylacrylate-methyl methacrylate resin graft type core-shell polymer in respects to 100 parts by weight of the acrylic resin that was 90% by weight of methyl methacrylate, 3% by weight of maleic anhydride, and 7% by weight of styrene, the film having the thickness of 20 μm was manufactured. These were used as second and third layers, and a multilayered film that included 2-1-3 layers was manufactured. By stretching the multilayered film at 110° C. by 100%, the retardation film that had the thickness of 50 μm was manufactured. The in-plane retardation of the retardation film was 110 nm, the thickness retardation was 120 nm, and there was no problem in terms of appearance when the heat resistance evaluation was performed at 80° C. for 100 hours.

EXAMPLE 3

The acrylic resin that was 74% by weight of methyl methacrylate, 11% by weight of maleic anhydride, and 15% by weight of styrene was subjected to extrusion molding to manufacture a film that was a first layer and have the thickness of 60 μm. In addition, by adding 10 parts by weight of the butadiene-methyl methacrylate resin graft type core-shell polymer in respects to 100 parts by weight of the acrylic resin that was 74% by weight of methyl methacrylate, 11% by weight of maleic anhydride, and 15% by weight of styrene, the film having the thickness of 20 μm was manufactured. These were used as second and third layers, and a multilayered film that included 2-1-3 layers was manufactured. By stretching the multilayered film at 120° C. by 100%, the retardation film that had the thickness of 55 μm was manufactured. The in-plane retardation of the retardation film was 135 nm, the thickness retardation was 140 nm, and there was no problem in terms of appearance when the heat resistance evaluation was performed at 80° C. for 100 hours.

EXAMPLE 4

The acrylic resin that was 80% by weight of hydroxyethyl methacrylate, 8% by weight of maleic anhydride, and 12% by weight of styrene was subjected to extrusion molding to manufacture a film that was a first layer and have the thickness of 40 μm. In addition, by adding 15 parts by weight of the butylacrylate-methyl methacrylate resin graft type core-shell polymer in respects to 100 parts by weight of the acrylic resin that was 90% by weight of hydroxyethyl methacrylate, 3% by weight of maleic anhydride, and 7% by weight of styrene, the film having the thickness of 20 μm was manufactured. These were used as second and third layers, and a multilayered film that included 2-1-3 layers was manufactured. By stretching the multilayered film at 110° C. by 100%, the retardation film that had the thickness of 52 μm was manufactured. The in-plane retardation of the retardation film was 105 nm, the thickness retardation was 115 nm, and there was no problem in terms of appearance when the heat resistance evaluation was performed at 80° C. for 100 hours.

COMPARATIVE EXAMPLE 1

The acrylic resin that was 30% by weight of methyl methacrylate, 10% by weight of maleic anhydride, and 60% by weight of styrene was subjected to extrusion moulding to manufacture a single layer film that had the thickness of 100 μm, and by stretching the film at 140° C. by 100%, the retardation film that had the thickness of 60 μm was manufactured. When it was stretched, a crack and splitting were occurred. The in-plane retardation of the retardation film was 120 nm, the thickness retardation was 130 nm, and the occurrence of the crack and splitting were increased when the heat resistance evaluation was performed at 80° C. for 100 hours.

COMPARATIVE EXAMPLE 2

The acrylic resin that was 30% by weight of methyl methacrylate, 10% by weight of maleic anhydride, and 60% by weight of styrene was subjected to extrusion molding to manufacture a film that was a first layer and have the thickness of 50 μm, the multilayered film that included the methyl methacrylate films having the thickness of 25 μm used as the second and third layers having the thickness of 25 μm was manufactured, and a multilayered film that included 2-1-3 layers was manufactured. By stretching the multilayered film at 130° C. by 100%, the retardation film that had the thickness of 50 μm was manufactured. When it was stretched, the crack and wrinkles were generated and the haze was increased. The in-plane retardation of the retardation film was 135 nm, the thickness retardation was 130 nm, and the film was bent and broken when the heat resistance evaluation was performed at 80° C. for 100 hours.

COMPARATIVE EXAMPLE 3

The styrene resin was subjected to the extrusion molding to manufacture a film that was the first layer and had the thickness of 50 μm. In addition, by adding 15 parts by weight of the butyl acrylate-methyl methacrylate resin graft type core-shell polymer in respects to 100 parts by weight of the acrylic resin that was 75% by weight of methyl methacrylate, 10% by weight of maleic anhydride, and 15% by weight of styrene, the film having the thickness of 15 μm was manufactured. These were used as second and third layers, and a multilayered film that included 2-1-3 layers was manufactured. By stretching the multilayered film at 130° C. by 100%, the retardation film that had the thickness of 40 μm was manufactured. An appearance of the stretched film was good. The in-plane retardation of the retardation film was 140 nm, the thickness retardation was 140 nm, and the film was distorted and largely bent when the heat resistance evaluation was performed at 80° C. for 100 hours.

The test results of Examples 1 to 4 are described in the following Table 1, and the test results of Comparative Examples 1 to 3 are described in the following Table 2.

TABLE 1

| film layer | Example 1 first layer | Example 1 second and third layers | Example 2 first layer | Example 2 second and third layers | Example 3 first layer | Example 3 second and third layers | Example 4 first layer | Example 4 second and third layers |
|---|---|---|---|---|---|---|---|---|
| resin composition (%) | MMA 74 MAH 11 ST 15 | MMA 74 MAH 11 ST 15 | MMA 80 MAH 8 ST 12 | MMA 90 MAH 3 ST 7 | MMA 74 MAH 11 ST 15 | MMA 74 MAH 11 ST 15 | HEMA 80 MAH 8 ST 12 | HEMA 90 MAH 3 ST 7 |
| rubber component | — | BA rubber 10 parts by weight | — | BA rubber 15 parts by weight | — | BU rubber 15 parts by weight | — | BA rubber 15 parts by weight |
| thickness (μm) | 60 | 20/20 | 40 | 20/20 | 60 | 20/20 | 40 | 20/20 |
| Tg (° C.) | 129 | 131 | 118 | 130 | 129 | 130 | 119 | 125 |
| appearance | excellent | | excellent | | excellent | | excellent | |
| $R_{in}$ (nm) | 140 | | 110 | | 135 | | 105 | |
| $R_{th}$ (nm) | 150 | | 120 | | 140 | | 115 | |
| tensile strength (N/mm$^2$) | 75 | | 85 | | 77 | | 80 | |
| heat resistance | excellent | | excellent | | excellent | | excellent | |
| transmittance | 91.5% | | 90.3% | | 91.6% | | 91.1% | |
| haze | 0.6% | | 0.8% | | 0.7% | | 0.8% | |

TABLE 2

| | Comparative Example 1 | Comparative Example 2 | | Comparative Example 3 | |
|---|---|---|---|---|---|
| film layer | first layer | first layer | second and third layers | first layer | second and third layers |
| resin composition (%) | MMA 90 MAH 10 ST 60 | MMA 30 MAH 10 ST 60 | MMA 100 | ST 100 | MMA 75 MAH 70 ST 15 |
| rubber component | — | — | — | — | BA rubber 15 parts by weight |
| thickness (μm) | 50 | 50 | 25/25 | 50 | 15/15 |
| Tg (° C.) | 130 | 130 | 100 | 100 | 130 |
| appearance | crack occurs and splited | wrinkles and broken | | good | |
| $R_{in}$ (nm) | 120 | 130 | | 140 | |
| $R_{th}$ (nm) | 130 | 130 | | 140 | |
| tensile strength (N/mm$^2$) | 55 | 60 | | 50 | |

TABLE 2-continued

|  | Comparative Example 1 | Comparative Example 2 | Comparative Example 3 |
|---|---|---|---|
| heat resistance | crack occurs and splited | bent and stripped | distorted and bent |
| transmittance | 91.7% | 90.9% | 90.5% |
| haze | 0.9% | 1.0% | 0.9% |

MMA: Methyl methacrylate,
HEMA: Hydroxyethyl methacrylate
MAH: Maleic anhydride,
ST: Styrene,
BA: Butyl acrylate,
BU: Butadiene From the results of Tables 1 and 2, it can be seen that the multi-layered acrylic retardation film according to the present invention has excellent heat resistance and optical transparency, and small haze, is not broken, and has excellent mechanical strength and durability.

The invention claimed is:

1. A retardation film comprising:
   a) a first acrylic resin layer that does not include rubber component; and
   b) a second acrylic resin layer that is layered on at least one side of a) the first acrylic resin layer and comprises an acrylic resin and 1 to 20 parts by weight of rubber component based on 100 parts by weight of the acrylic resin,
   wherein both the first acrylic resin layer and the second acrylic resin layer comprise an acrylic copolymer that comprises an acrylic monomer, a styrene monomer, and a maleic anhydride monomer,
   wherein the glass transition temperature ($T_g$) of a) the first acrylic resin layer and b) the second acrylic resin layer is in the range of 100 to 250° C., and
   wherein a difference between the glass transition temperature ($T_g$) of a) the first acrylic resin layer and the glass transition temperature ($T_g$) of b) the second acrylic resin layer is in the range of 0 to 30° C.

2. The retardation film according to claim 1, wherein in a) the first acrylic resin layer and b) the second acrylic resin layer comprising the rubber component, the content of the acrylic resin is in the range of 40 to 99% by weight.

3. The retardation film according to claim 1, wherein in a) the first acrylic resin layer and b) the second acrylic resin layer comprising the rubber component, the acrylic monomer for forming acrylic resin is selected from the group consisting of methyl methacrylate, ethyl methacrylate, propyl methacrylate, n-butyl methacrylate, t-butyl methacrylate, cyclohexyl methacrylate, benzyl methacrylate, methoxyethyl methacrylate, ethoxyethyl methacrylate, butoxymethyl methacrylate, hydroxyethyl methacrylate and an oligomer thereof.

4. The retardation film according to claim 1, wherein the content of the styrene monomer in the acrylic copolymer is in the range of 1 to 60% by weight.

5. The retardation film according to claim 1, wherein the content of the maleic anhydride monomer in the acrylic copolymer is in the range of 3 to 30% by weight.

6. The retardation film according to claim 1, wherein a) the first acrylic resin layer or b) the second acrylic resin layer comprising the rubber component comprises at least one additive that is selected from the group consisting of a UV absorbing agent, a plasticizer, and a retardation accelerating agent.

7. The retardation film according to claim 6, wherein the UV absorbing agent is selected from the group consisting of a triazine UV absorbing agent, a triazole UV absorbing agent, and a HALS (hindered amine light stabilizer) UV absorbing agent.

8. The retardation film according to claim 6, wherein the plasticizer is a phosphate ester plasticizer or a carboxylic acid ester plasticizer.

9. The retardation film according to claim 6, wherein the retardation accelerating agent is selected from the group consisting of trans-stilbene, diphenylacetylene, trans, trans-1,4-diphenyl-1,3-butadiene, biphenyl, dibenzofuran, 2,7-dibromofluorene, carbazole, and N-vinyl carbazole.

10. The retardation film according to claim 1, wherein the thickness of a) the first acrylic resin layer is in the range of 2 to 100 μm.

11. The retardation film according to claim 1, wherein the rubber component of b) the second acrylic resin layer comprising the rubber component is a rubber or rubber-acrylic graft type core-shell polymer that has a refractive index in the range of 1.480 to 1.550.

12. The retardation film according to claim 11, wherein the rubber component is selected from the group consisting of alkyl acrylates, silicones, and dienes.

13. The retardation film according to claim 11, wherein the rubber-acrylic graft type core-shell polymer is particles having a rubber based on butadiene or a butyl acrylate-co-styrene copolymer as a core, and poly(methyl methacrylate) (PMMA) or polystyrene as a shell.

14. The retardation film according to claim 1, wherein the thickness of b) the second acrylic resin layer comprising the rubber component is in the range of 2 to 50 μm.

15. The retardation film according to claim 1, wherein the total thickness of the retardation film is in the range of 4 to 200 μm.

16. The retardation film according to claim 1, wherein an in-plane retardation ($R_{in}$) that is represented by the following Equation 1 is in the range of 50 to 250 nm, and a thickness retardation ($R_{th}$) that is represented by the following Equation 2 is in the range of 50 to 250 nm of the retardation film:

$$R_{in} = (N_x - N_y) \times d \quad \text{[Equation 1]}$$

$$R_{th} = (N_x - N_y) \times d \quad \text{[Equation 2]}$$

wherein $N_x$ is an in-plane refractive index in an extending direction, $N_y$ is an in-plane refractive index in a direction that is vertical to the extending direction, $N_z$ is a refractive index of the thickness direction, and d is the thickness of the film.

17. The retardation film according to claim 1, wherein the retardation film is a retardation film having a three layer structure in which b) the second acrylic resin layer comprising the rubber component is layered on both sides of a) the first acrylic resin layer.

* * * * *